(12) United States Patent
Pulskamp et al.

(10) Patent No.: US 8,968,942 B2
(45) Date of Patent: Mar. 3, 2015

(54) METAL OXYGEN BATTERY CONTAINING OXYGEN STORAGE MATERIALS

(75) Inventors: Andrea Pulskamp, Plymouth, MI (US); Andrew Robert Drews, Ann Arbor, MI (US); Donald J. Siegel, Ann Arbor, MI (US); Bruce Carvell Blakemore, Plymouth, MI (US); Ronald David Brost, Dearborn, MI (US); Jun Yang, Ann Arbor, MI (US); Shinichi Hirano, West Bloomfield, MI (US); Michael Alan Tamor, Toledo, OH (US)

(73) Assignee: Ford Global Technologies, LLC, Dearborn, MI (US)

(*) Notice: Subject to any disclaimer, the term of this patent is extended or adjusted under 35 U.S.C. 154(b) by 193 days.

(21) Appl. No.: 12/828,380

(22) Filed: Jul. 1, 2010

(65) Prior Publication Data

US 2011/0143227 A1 Jun. 16, 2011

(51) Int. Cl.
*H01M 12/06* (2006.01)
*H01M 8/22* (2006.01)
*H01M 8/04* (2006.01)
*H01M 4/90* (2006.01)

(52) U.S. Cl.
CPC ............ *H01M 12/06* (2013.01); *H01M 4/9008* (2013.01); *H01M 8/04216* (2013.01); *H01M 8/225* (2013.01); *Y02E 60/50* (2013.01)
USPC .......................................... 429/407; 429/403

(58) Field of Classification Search
USPC ................................................ 429/402–407
See application file for complete search history.

(56) References Cited

U.S. PATENT DOCUMENTS

| 4,105,830 | A | 8/1978 | Kordesch |
| 4,369,235 | A | 1/1983 | Bursell |
| 4,482,618 | A | 11/1984 | Orsino et al. |
| 4,762,978 | A | 8/1988 | Tanis |
| 6,238,821 | B1 | 5/2001 | Mukherjee et al. |
| 6,280,871 | B1 | 8/2001 | Tosco et al. |

(Continued)

FOREIGN PATENT DOCUMENTS

| JP | 2006221993 A | 8/2006 |
| JP | 2009230985 A | 10/2009 |

(Continued)

OTHER PUBLICATIONS

C. Combelles et al., Structural, Magnetic and Redox Properties of a New Cathode Material for Li-ion Batteries; The Iron-based Metal Organic Framework, Ionics, Abstract, vol. 14, No. 4, Jul. 2008, pp. 279-283.

(Continued)

*Primary Examiner* — Gregg Cantelmo
(74) *Attorney, Agent, or Firm* — Damian Porcari; Brooks Kushman P.C.

(57) ABSTRACT

A battery system includes a metal oxygen battery. The metal oxygen battery includes a first electrode and a second electrode. The second electrode includes a metal material (M). The metal oxygen battery is in communication with an oxygen storage material. In certain instances, the oxygen storage material is contained within an oxygen containment unit. The metal oxygen battery and the oxygen containment unit may be in a closed-loop with respect to each other. The battery system further includes a conduit for providing fluid communication from one of the metal oxygen battery and the oxygen containment unit to the other of the metal oxygen battery and the oxygen containment unit.

20 Claims, 4 Drawing Sheets

(56) References Cited

U.S. PATENT DOCUMENTS

| | | | |
|---|---|---|---|
| 6,372,370 B1 | 4/2002 | Kaplan et al. | |
| 6,599,655 B2 | 7/2003 | Johnson et al. | |
| 7,070,882 B1 | 7/2006 | Ferrando | |
| 7,147,967 B1 | 12/2006 | Read | |
| 7,198,867 B2 | 4/2007 | Sanders | |
| 7,309,380 B2 | 12/2007 | Muller et al. | |
| 7,481,866 B2 | 1/2009 | MacGillivray et al. | |
| 7,517,396 B2 | 4/2009 | Arnold et al. | |
| 7,553,352 B2 | 6/2009 | Mueller et al. | |
| 7,652,132 B2 | 1/2010 | Yaghi et al. | |
| 2003/0075643 A1 | 4/2003 | Dunn | |
| 2003/0099884 A1 | 5/2003 | Chiang et al. | |
| 2003/0170516 A1 | 9/2003 | Prerad | |
| 2004/0225134 A1* | 11/2004 | Yaghi et al. | 549/211 |
| 2005/0287421 A1 | 12/2005 | Simon et al. | |
| 2006/0127764 A1 | 6/2006 | Chen et al. | |
| 2006/0292434 A1 | 12/2006 | Hampden-Smith et al. | |
| 2007/0141431 A1 | 6/2007 | Wang et al. | |
| 2007/0172739 A1 | 7/2007 | Visco et al. | |
| 2008/0299456 A1 | 12/2008 | Shiga et al. | |
| 2009/0123811 A1 | 5/2009 | Baumann et al. | |
| 2009/0239132 A1 | 9/2009 | Johnson | |
| 2009/0261107 A1* | 10/2009 | Allgeier et al. | 220/562 |
| 2010/0151336 A1* | 6/2010 | Nakanishi | 429/407 |
| 2010/0186588 A1 | 7/2010 | Yaghi et al. | |
| 2011/0104576 A1 | 5/2011 | Johnson et al. | |

FOREIGN PATENT DOCUMENTS

| | | | | |
|---|---|---|---|---|
| WO | 99/60654 | | 11/1999 | |
| WO | WO2007/074098 | * | 7/2007 | B60K 15/063 |
| WO | WO2008/136296 | * | 11/2008 | H01M 12/08 |

OTHER PUBLICATIONS

M. Mirzaeian et al., Preparation of Controlled Porosity Carbon Aerogels for Energy Storage in Rechargeable Lithium Oxygen Batteries, Electrochimica Acta 54, (2009), pp. 7444-7451.

* cited by examiner

METAL OXYGEN BATTERY CONTAINING OXYGEN STORAGE MATERIALS

BACKGROUND

1. Technical Field

One or more embodiments of the present invention relate to oxygen storage materials as a source of oxygen for metal oxygen batteries and their method of use.

2. Background Art

There are many power storage and generation devices for vehicles. For instance, a fuel cell is a thermodynamically open system in which a fuel, such as hydrogen, irreversibly reacts with an oxidant, such as oxygen, to form water and electrical energy. By contrast, a battery is an electrochemical device that is often formed of a number of separate electrochemical battery cells interconnected to a single set of terminals providing an electrical output.

SUMMARY

According to one aspect of the present invention, a battery system is provided. In one embodiment, the battery system includes a metal oxygen battery including a first electrode and a second electrode, the second electrode including a metal material (M); and an oxygen containment unit in communication with the metal oxygen battery, the oxygen containment unit including an oxygen storage material. In certain instances, the first electrode is a cathode and the second electrode is an anode.

In another embodiment, the metal oxygen battery and the oxygen containment unit are in a closed-loop with respect to each other.

In yet another embodiment, the oxygen containment unit has a first operating state and a second operating state different from the first operating state. In certain instances, the first and second operating states collectively define a reversible operating state. In certain other instances, the oxygen containment unit has a first operating state of oxygen absorption into the oxygen storage material and a second operating state of oxygen desorption from the oxygen storage material.

In yet another embodiment, the oxygen containment unit is an oxygen physisorption containment unit. In certain instances, the oxygen containment unit is a sealed oxygen containment unit.

In yet another embodiment, the battery system is for use in a vehicle under a range of operating conditions, wherein the oxygen storage material is a solid under the range of operating conditions.

In yet another embodiment, the metal oxygen battery has a first operating state of oxygen uptake forming an oxide of M and a second operating state of oxygen release from the oxide of M to oxygen. In certain instances, the metal oxygen battery includes the metal material (M) and oxygen in a first operating state. In certain other instances, the metal oxygen battery includes metal peroxide in a second operating state.

In yet another embodiment, the metal oxygen battery has a reversible operating state.

In yet another embodiment, the metal oxygen battery includes a catalytic component. In certain instances, the metal oxygen battery includes an electronically conductive component. In certain other instances, the metal oxygen battery includes an ionically conductive component.

In yet another embodiment, the metal oxygen battery is substantially impermeable to atmospheric air.

In yet another embodiment, the battery system further includes a conduit for providing fluid communication from one of the metal oxygen battery and the oxygen containment unit to the other of the metal oxygen battery and the oxygen containment unit.

In yet another embodiment, the battery system is for use in a vehicle under a range of operating conditions, wherein the battery system does not include an oxygen input external to the battery system during under the range of operating conditions.

According to another aspect of the present invention, a method is provided for operating a metal oxygen battery. In one embodiment, the method includes providing a fluid communication between a metal oxygen battery and an oxygen containment unit, wherein the oxygen containment unit includes an oxygen storage material.

DETAILED DESCRIPTION

Reference will now be made in detail to embodiments of compositions, structures, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable.

Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

There are many power storage and generation devices for vehicles. For instance, a fuel cell is a thermodynamically open system in which a fuel, such as hydrogen, irreversibly reacts with an oxidant, such as oxygen, to form water and electrical energy. By contrast, a battery is an electrochemical device that is often formed of a number of separate electrochemical battery cells interconnected to a single set of terminals providing an electrical output.

Electrochemical battery cells can include numerous configurations and chemistries, including primary or non-rechargeable battery cells and secondary or rechargeable battery cells. Non-limiting examples of a secondary battery cell include a lithium ion cell, a metal hydride cell, a metal-air battery cell, and a metal-oxygen battery cell. In general, a secondary battery cell is capable of storing electrical energy chemically, and the chemical storage often involves a reversible redox reaction. In the uncharged state, the redox reaction does not start spontaneously, and, in such cases, the secondary battery cell needs to be charged initially in order to store energy.

In one example of a secondary battery cell, a lithium ion cell includes a layered oxide positive electrode including lithium in ionic communication with a graphite negative electrode through a non-aqueous electrolyte and a separator. During charging, lithium is ionized from the layered oxide positive electrode and migrates through the electrolyte and separator to the negative electrode and becomes embedded in the porous negative electrode composition by the process of intercalation. During a discharge half step, the intercalation composition decomposes allowing current to flow within the battery cell by the movement of lithium ions from the negative electrode to the positive electrode.

In another example of a secondary battery cell, a metal hydride battery cell includes a metal oxyhydroxide positive electrode, such as a nickel oxyhydroxide, electrically communicating with a metal alloy negative electrode. The metal alloy negative electrode is a hydrogen storage alloy negative electrode. The hydrogen storage alloy includes a material reversibly forming a mixture of metal hydride compounds. In certain instances, the hydrogen storage alloy includes an intermetallic material having two or more solid phase metallic elements.

In yet another example of a secondary battery cell, a metal air battery cell is, in typical configurations, an open system with respect to material flow, heat transfer, and work. For instance, a metal air battery cell is provided with holes, openings, or vents, which mediate air transport between the metal air battery and atmospheric air. For most metal air batteries, moisture and interfering gases from the air often need to be filtered, eliminated, or trapped prior to the air's being introduced to the metal air battery. For instance, the metal air battery cell includes an air positive electrode electrically communicating with a metal negative electrode through an electrolyte and a separator. The air positive electrode, in typical configurations, includes a carbon composition positive electrode. During the charge reaction, oxygen is released to the ambient air.

Metal oxygen batteries (MOBs) are conventionally characterized as a subgroup of the metal air batteries as oxygen is commonly involved for the electrochemical reactions. MOBs are known to have relatively high electrochemical capacities, and are therefore of great interest for applications where the total mass of a given battery is limited. Implementation of conventional MOBs has been met with difficulties in that their performance, both in terms of capacity and power, has been largely unsatisfactory. The limited performance is believed to be at least in part associated with incomplete or slow reactions involving the arrival and diffusion of oxygen molecules. For an MOB to achieve its full discharge capacity, sufficient quantities of oxygen must be made available in a timely manner. In addition, since the rate of discharging is tied to the formation and growth of the positive electrode oxide, the battery's rate of discharging at least in part depends on the more rate limiting processes of oxygen diffusion.

In one or more embodiments, the term metal oxygen battery (MOB) refers to a battery structure that differs from conventional metal oxygen/air batteries at least in that the MOB is relatively closed to atmospheric air and oxygen for reactions is relatively devoid of unwanted species such as nitrogen or carbon dioxide.

In one or more embodiments, the term "electrode" may refer to a structure through which charges are carried by electromotive force. Electrodes may be composed of one or more metal and/or semiconductor. Electrodes may be solid or liquid.

In one or more embodiments, the term "electrolyte" refers to a material and/or structure through which charges are carried by the movement of ions. Electrolytes may be any phase on the continuum of liquid to solid, including gels, pastes, fused salts, ionic liquids, organic carbonates, or ionically conducting solids, such as sodium β-alumina, which has mobile sodium ions.

In one or more embodiments, metal-oxygen batteries (MOBs) may refer to a class of electrochemical cells in which, during discharging, oxygen is reduced at a positive electrode surface as part of the electrochemical cell reaction. Reduction of the oxygen forms an oxide or peroxide ion which reacts with a cationic metal species. Metal-oxygen batteries may be based upon Fe, Zn, Al, Mg, Ca, and Li.

MOBs, such as $Li^+$ based MOBs, have recently been demonstrated experimentally in a small number of laboratories. However, implementation of conventional MOBs has been largely unsuccessful because their performance, both in terms of capacity and power, has been unsatisfactory for vehicle applications. The limited performance is believed to be likely associated with incomplete or slow reactions involving the arrival and dissociation of oxygen molecules from the atmospheric air. In particular, for a metal oxygen battery to achieve its full discharge capacity, sufficient quantities of oxygen should be made available in a timely manner. In addition, since the rate of discharge is tied to the formation and growth of the cathode oxide, the battery's rate of discharge depends in part on the more rate limiting processes of oxygen dissociation.

It has been found, according to one or more embodiments of the present invention, that the MOB performance can be greatly improved by one or more of the following approaches: (1) providing a relatively high concentration of oxygen at the positive electrode; and/or (2) increasing oxygen diffusion rate at the positive electrode.

One or more of the following benefits can be realized according to certain embodiments of the present invention: (1) requirements for many balance of plant (BOP) components including positive electrode flow field, blower, and air purification system, can be reduced or eliminated; (2) susceptibility to contamination from atmospheric air impurities can be reduced or eliminated; (3) battery system flexibility may be increased and packaging costs can be reduced; (4) battery cell manufacturing procedures may be simplified; and/or (5) improved battery performance kinetics may be realized via a reduction in bulk diffusion and an increase in surface diffusion.

Figures 1A, 1B:
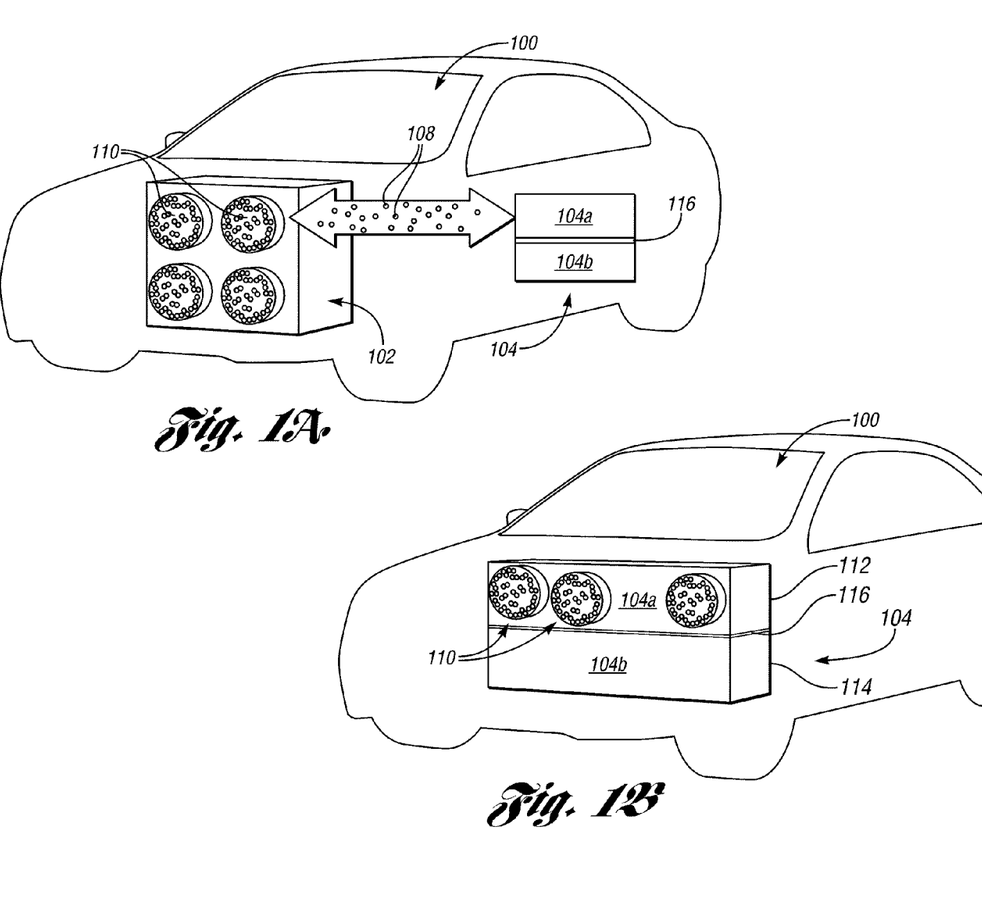
FIG. 1A depicts an illustrative view of a battery system for use in a vehicle according to one embodiment.
FIG. 1B depicts an illustrative view of a battery system for use in a vehicle according to another embodiment of the present invention.

According to one aspect of the present invention, a battery system is provided. In one embodiment, and as depicted in FIG. 1A, a battery system generally shown at 100 includes a metal oxygen battery 104 having a first electrode 104a and a second electrode 104b, the second electrode 104b including a metal material M (not shown); and an oxygen containment unit 102 communicates oxygen 108 to and from the metal oxygen battery 104. The oxygen containment unit includes an oxygen storage material "OSM" 110. In certain instances, the oxygen containment unit 102 is in fluid communication with the metal oxygen battery 104, and in certain particular instances the fluid is oxygen.

In another embodiment, and as depicted in FIG. 1B, the oxygen storage material 110 is disposed within the metal oxygen battery 104. In certain instances, the metal oxygen battery 104 further includes a separator 116 defining a first electrode compartment 112 including the first electrode 104a and a second electrode compartment 114 including the second electrode 104b. In this configuration, the oxygen storage material 110 is disposed within the first electrode compartment 112 and communicates oxygen 108 to and from the first electrode 104a.

In one or more embodiments, the metal material M includes one or more elemental metal listed in the periodic table and/or one or more alloys formed of a mixture of two or more of the elemental metals. A non-limiting list of the elemental metals includes alkali metals, alkaline earth metals, transition metals and post-transition metals.

In certain instances such as during discharging, the first electrode 104a functions as a positive electrode or a cathode, and the second electrode 104b functions as a negative electrode or an anode. In certain other instances such as during charging, the first electrode 104a may function as a negative electrode or an anode, and the second electrode 104b may function as a positive electrode or a cathode. In these instances, the term "positive electrode" refers to an electrode with a positive polarity, and the term "negative electrode" refers to an electrode with a negative polarity.

Figures 2, 3A, 3B, 3C:
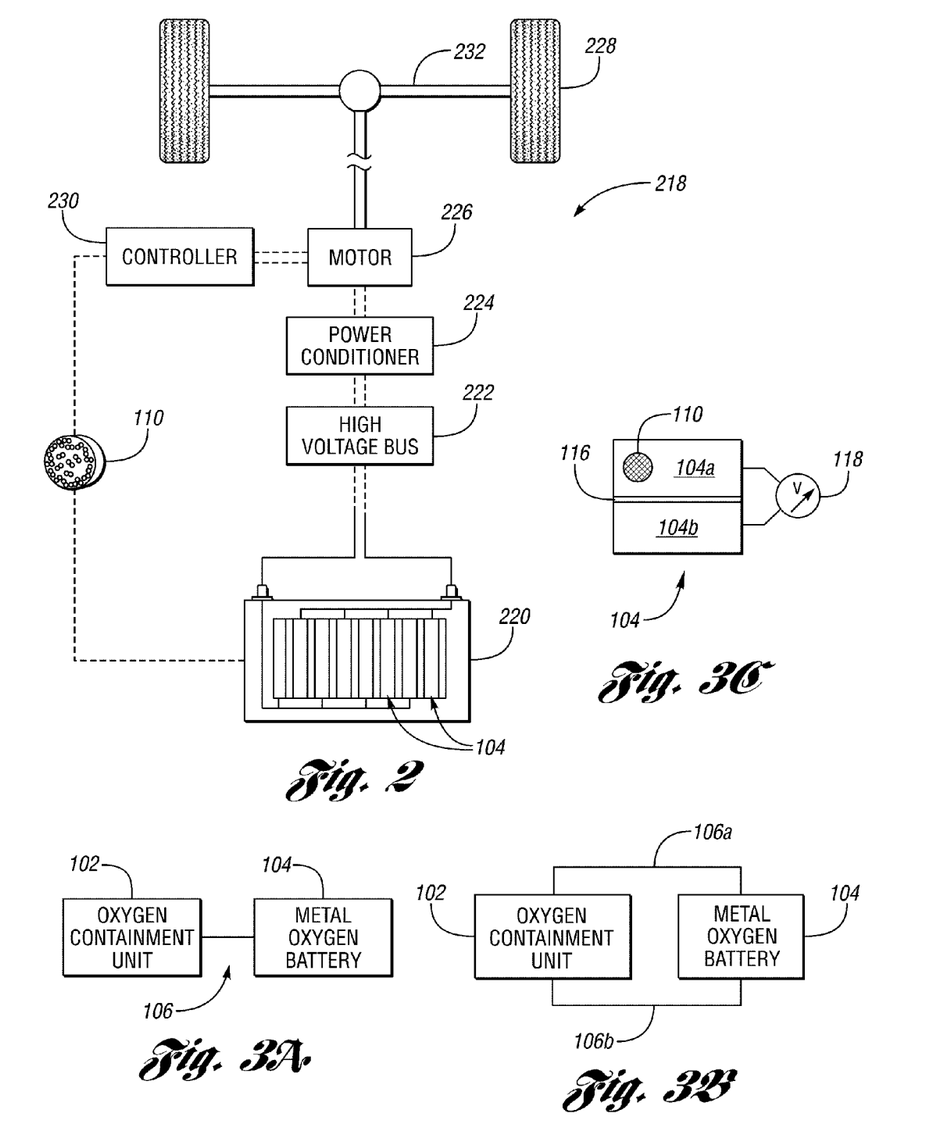
FIG. 2 illustrates a top view of an electric vehicle including a metal oxygen battery or a metal oxygen battery system according to another embodiment of the present invention.
FIGS. 3A and 3B depict illustrative views of the battery system in FIG. 1A.
FIG. 3C depicts illustrative view of the battery system referenced in FIG. 1B.

FIG. 2 illustrates a top view of an electric vehicle including a metal oxygen battery or a metal oxygen battery system according to another embodiment of the present invention. As illustratively depicted in FIG. 2, connected to vehicle 218 is a metal oxygen battery (MOB) system 220 electrically communicating directly or indirectly with a controller 230. In certain instances, the MOB or MOB system 220 is the MOB 104 referenced in FIG. 1A, FIG. 1B, FIG. 3A, FIG. 3B, and/or FIG. 3C. The controller 130 electrically communicates with a traction motor 226. Traction motor 226 is connected to at least one wheel 228 of the vehicle 218. In certain instances, MOB battery system 220 electrically communicates with and provides energy to a high-voltage bus 222. High-voltage bus 222 electrically communicates with and provides energy to a power conditioner 224. The power conditioner 224 electrically communicates with the traction motor 226 which is connected directly or indirectly to wheel 228 situated on a frame 232. In certain instances, and as illustratively depicted in FIG. 2, the controller 230 controls oxygen communication between the MOB system 220 and the OSM 110, and particularly oxygen release from and/or storage into the OSM 110.

In yet another embodiment, and as depicted in FIGS. 3A and 3B, the metal oxygen battery 104 and the oxygen containment unit 102 are in a closed-loop with respect to each other. In one configuration and as illustratively depicted in FIG. 3A, the oxygen containment unit 102 is in fluid communication with the metal oxygen battery 104 through a conduit 106. In another configuration and as illustratively depicted in FIG. 3B, the oxygen containment unit 102 is in fluid communication with the metal oxygen battery 104 through a first conduit 106a. The metal oxygen battery 104 is in fluid communication with the oxygen storage material 102 via an opposing second conduit 106b. In certain instances, the metal oxygen battery 104 and the oxygen containment unit 102 are in a closed-loop with respect to material flow, such as oxygen flow, while being receptive to heat transfer or work with the surrounding environment.

In yet another embodiment, and as depicted in FIG. 3C, the oxygen storage material 110 can be disposed within the metal oxygen battery 104, and in particular within the electrode 104a which functions as a cathode during battery discharging. An external load circuit 118 connects the first and second electrode 104a, 104b.

It is appreciated that in one or more embodiments, the oxygen containment unit 102 may be open for venting the residual oxygen out and/or for reloading fresh oxygen, as oxygen is readily available.

In yet another embodiment, the oxygen containment unit 102 has a first operating state and a second operating state different from the first operating state. In certain instances, and as depicted in FIGS. 1 and 3, the first operating state of the oxygen containment unit 102 includes absorption of oxygen 112 into the oxygen storage material 110. Conversely, the second operating stage of the oxygen containment unit 102 includes desorption of oxygen 112 from the oxygen storage material 110. The first operation state of the oxygen containment unit 102 may be closely related to a corresponding operation state of the metal oxygen battery 104 wherein oxygen 112 is being returned back from the metal oxygen battery 104 via the opposing second conduit 106b, for instance, during and after a battery charging process. The second operation state of the oxygen containment unit 102 may be closely related to a corresponding operation state of the metal oxygen battery 104 wherein oxygen 112 is released into the metal oxygen battery 104 via the first conduit 106a, for instance, during and after a discharging process.

Without being limited to any particular theory, it is believed that during electrical discharging, metal M is oxidized to form metal cation $M^+$ at the second electrode 104b which functions as an anode. The metal cation $M^+$ flows from the anode through an electrolyte and combines with reduced oxygen anion $O_2^-$ or $O^-$ to form metal oxide $M_xO_2$ at the first electrode 104a which functions as a cathode, wherein value x is the charge balance dependent upon the valence of the metal M. In certain instances, the metal oxide $MxO_2$ is inserted in the cathode. This process of electrical discharging is coupled to the flow of electrons from the second electrode 104b or an anode, to the first electrode 104a or a cathode, via a load circuit.

In this configuration, it is appreciated that the MOB 104 is substantially free of water molecules and particularly liquid water molecules.

In one or more embodiments, the term "substantially free" refers to an extent of being less than 1000 parts per million (ppm), less than 500 ppm, less than 200 ppm, less than 100 ppm, or less than 50 ppm. In some instances means that a substance, such as water, is not purposefully added and whose presence, if any, is only incidental.

In yet another embodiment, the oxygen containment unit 102 includes relatively pure oxygen species in that any other gas or fluid species, such as nitrogen ($N_2$), is not present or only incidentally present at a nominal amount. This is in direct contrast to atmospheric air wherein nitrogen has a relatively significant presence relative to oxygen. In certain instances, when incidentally present, nitrogen is less than 1000 ppm, less than 500 ppm, less than 100 ppm, or less than 50 ppm.

As stated herein, one of the advantages of the present invention, in one or more embodiments, is that oxygen can be stored in the oxygen storage material 110 with a relatively high concentration and/or density as unusable or interfering gas molecules such as nitrogen can be effectively avoided. As a result, an oxygen material flow communicating between the MOB 104 and the OSM 110 can be achieved in a relatively low flow rate, which further reduces system costs associated with effecting and maintaining otherwise relatively high flow rate operations.

In yet another embodiment, the oxygen containment unit 102 is an oxygen physisorption containment unit wherein substantial amount of the oxygen molecules 112 contained within the oxygen containment unit 102 is disposed within and/or onto the OSM 110 via physisorption. Without being limited to any particular theory, it is believed that physisorption occurs when absorbate, such as oxygen, adheres to the surface only through van der Waals interactions, which are relatively weak intermolecular forces. The physisortpion may be characterized by one or more of the following additional features: (1) having relatively low enthalpy, such as fewer than 40 KJ/mol; (2) with absorption taking place in two or more layers; (3) requiring relatively low activation energy such as less than 100 KJ/mol; (4) with the energy state of OSM not being altered; and (5) OSM absorption being reversible.

Figure 4A:
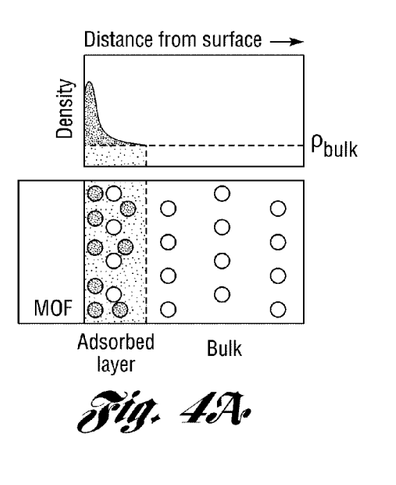
FIGS. 4A-4D depict an illustrative view of different stages of oxygen physisorption into an oxygen storage material.
Figure 4B:
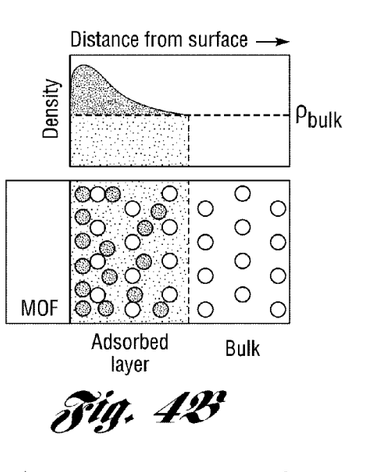
Figure 4C:
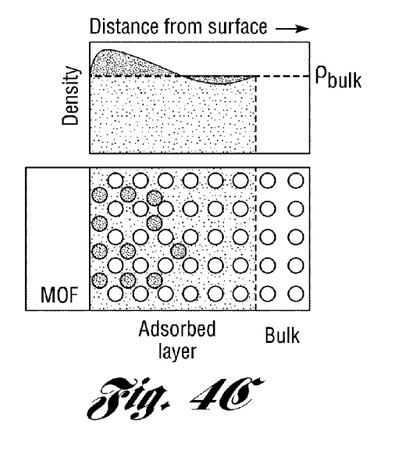

It is appreciated that oxygen physisorption being able to take place on two or more layers of the OSM makes an OSM a particularly suitable oxygen carrier for use onboard a vehicle. Without being limited to any particular theory, it is believed that oxygen concentration is a function of distance from the OSM surface. As illustrated in FIGS. 4A-4C, there is presented a schematic of the relation between the surface excess mass and absolute adsorbed amount, wherein open circles represent unoccupied OSM pores and shaded circles represent OSM pores that have oxygen molecules absorbed therein. Absolute adsorbed amounts include all oxygen species in the adsorbed layer, summation of areas represented by the solid circles and the open circles corresponds to the absolute adsorbed amount. The density of excess mass is not necessarily higher than the bulk oxygen density at all locations, and negative excess mass can be obtained under large bulk density.

Figure 4D:
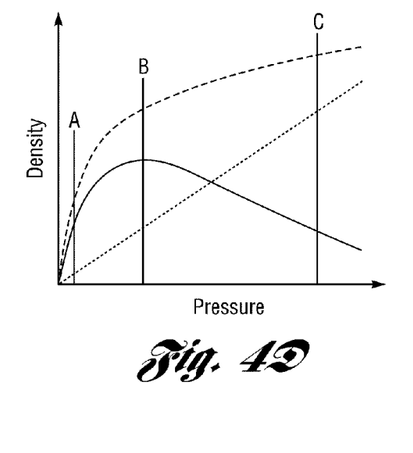

Generally, oxygen density increases with pressure applied. Similarly, more OSM layers are occupied with oxygen molecules as pressure goes up. As illustrated in FIG. 4D, the surface excess amount (represented by the solid curve) is provided with a maximum value because the excess mass can be decreased in the relatively high pressure region, while total oxygen gas uptake (represented by the dashed curve) increases monotonically as a function of pressure because of the contribution from the large bulk density (represented by the dotted curve) of the oxygen storage material.

Figure 5A:
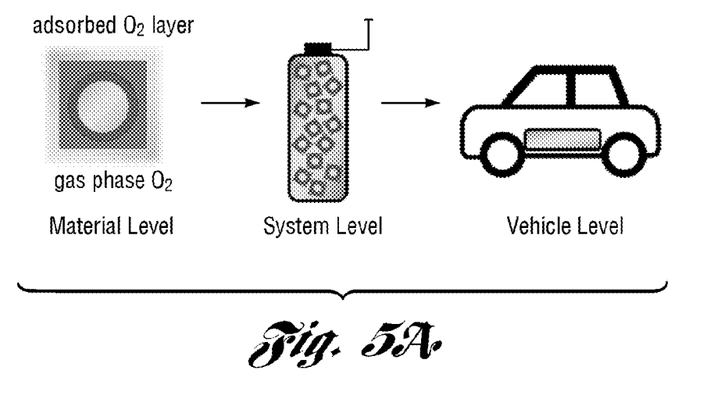
FIGS. 5A-5B depict an illustrative view of different oxygen storage capacities particular to an oxygen storage material that can be used in a vehicle for supplying oxygen to a metal oxygen battery according to another embodiment of the present invention.
Figure 5B:
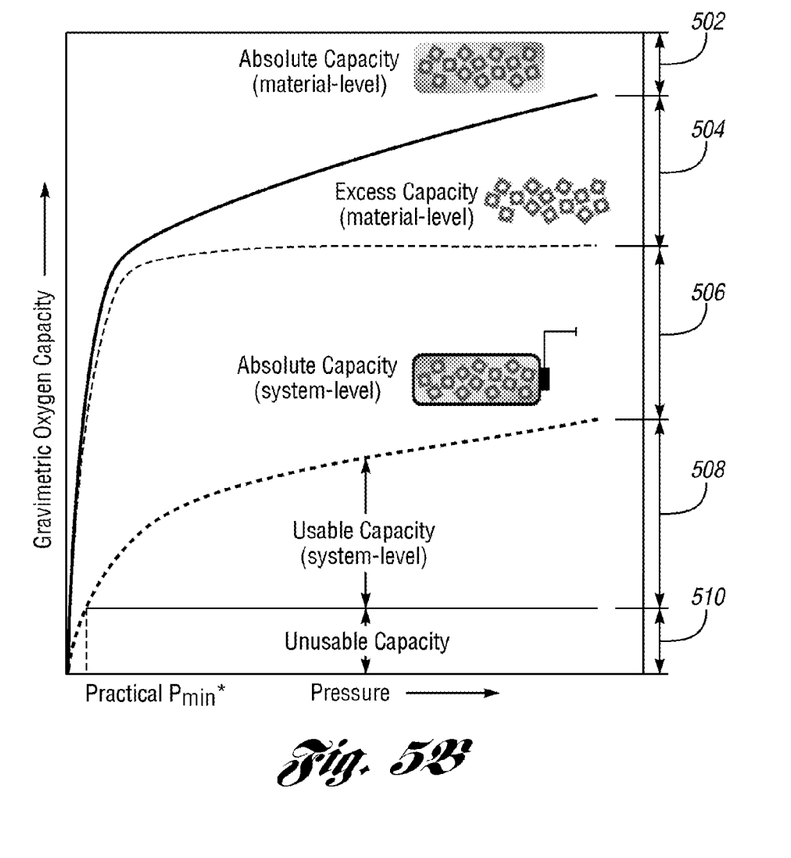

Oxygen storage features unique to the OSM present particular benefits in providing oxygen for use onboard a vehicle. As illustrated in FIGS. 5A and 5B, gravimetric oxygen capacity is a function of pressure applied, wherein the function varies with the type of oxygen storage capacity. FIG. 5B depicts a schematic of the relation of oxygen storage at the materials level, at the system level, and at the vehicle level. As depicted in FIG. 5B, the area generally shown at 510 represents unusable capacity. There will likely be oxygen left in the oxygen containment unit such as a storage tank due to a minimum delivery pressure limit for operation. This low-pressure or unusable capacity is excluded from the useable capacity. The area generally shown at 508 represents usable capacity. The area generally shown at 506 represents absolute capacity at the system level. In a vehicle context, capacity is reported on a system level. This takes into account the weight and volume of all of the ancillary fuel system components, often referred to as the balance of plant (BOP), which includes: the vessel for material containment, oxygen source, thermal management equipment, pressure regulators, valves, piping, sensors, safety components, mounting brackets. The system based capacity is an upper limit to the amount of useable oxygen. The area generally shown at 504 represents excess capacity. The excess capacity refers to the amount of oxygen adsorbed on the surface on the oxygen storage material. The area generally shown at 502 represents absolute capacity at the materials level. The absolute capacity includes excess capacity in addition to the amount of oxygen in gas phase that is not yet absorbed onto the oxygen storage material surface but present in the free pore volume.

In yet another embodiment, the oxygen containment unit 102 is a sealed containment unit. In this configuration, it is appreciated that there exists no intentionally or purposefully designed material exchange between the oxygen containment unit 102 and the external environment, other than the conduits 106a, 106b providing the fluid communication between the oxygen containment unit 102 and the metal oxygen battery 104. In certain instances, the oxygen containment unit is sealed and has an exterior substantially impermeable to the atmospheric air or any components thereof, such as oxygen and nitrogen.

In yet another embodiment, the oxygen storage material 110 is a solid under a range of operating conditions. The range of operating conditions includes any temperature or any range of temperature between 77 degrees Kelvin to 500 degrees Kelvin, any pressure or any range of pressure between 1 bar to 700 bar It is appreciated that the operating conditions for the MOB 104 are not necessarily the same as, but can be coincidental to, the operating conditions for the OSM 110 stated herein. For instance, the operating conditions for the MOB 104 include any temperature or any range of temperature between 230 degrees Kevin and 310 degrees Kevin, and any pressure or any range of pressure between 1 bar and 700 bar. Without being limited to any particular theory, it is appreciated that under any one of these ranges of operating conditions, a vehicle is operable with relatively more energy and cost efficiency.

It is also appreciated that operating conditions may also vary based on the operating state of the OSM 110 and/or the MOB 104. For instance, a relatively lower temperature and/or a higher pressure may be used during an oxygen charging state wherein oxygen is returned back to the OSM 110 for storage. For similar reasons, a relatively higher temperature and/or a lower pressure may be used during an oxygen discharging state wherein oxygen is released from the OSM 110.

In yet another embodiment, the metal oxygen battery 104 includes a catalytic component, an electronically conductive component, an ionically conductive component, or any combination thereof.

Non-limiting examples of the catalytic component include metal oxides such as $Co_3O_4$, $Fe_2O_3$; precious metals such as Pt; metal nitrides; metal silicides; and metal organics.

Non-limiting examples of the electronically conductive component include graphite, carbon black, hard carbons, metal oxides, amorphous carbon, nanotubes, grapheme polymers such as polyacrylonitrile, polyethylene oxide liquids such as propylene carbonate, ethylene carbonate, dimethyl carbonate, diethyl carbonate, and inorganics such as lithium phosphorous oxynitride under the name of LIPON.

Non-limiting examples of the ionically conductive component include lithium silicon under the name of LISICON and oxynitride.

In yet another aspect of the present invention, a method for operating an MOB is provided. In one embodiment, the method includes providing a fluid communication between a metal oxygen battery and an oxygen containment unit, wherein the oxygen containment unit includes an oxygen storage material.

In one or more embodiments, the metal-oxygen battery cell is a closed-loop system with respect to material flow, but not to heat transfer or work. For instance, the metal-oxygen battery cell includes an oxygen positive electrode electrically communicating with a metal negative electrode through an electrolyte and a separator. The oxygen positive electrode includes an oxygen storage material which stores oxygen by the process of physiosorption, including adsorption, intercalation and clathratization processes. It should be appreciated that the oxygen positive electrode may further include a structural component in addition to the oxygen storage material, such as a carbon material. It is appreciated that the metal-oxygen battery positive electrode may further include a catalytic component, such as $Fe_2O_3$ and/or $Co_3O_4$; an ion conductive component, such as polyacrylonitrile and/or polyethylene oxide; and/or an electron conductive component including a conductive aid, such as amorphous carbon, graphitic carbon, graphene, and/or carbon nanotubes.

In one or more embodiments, the metal-oxygen battery cell undergoes reversible redox reactions. During the discharging reaction, the oxygen reacts with a metal cation from the metal negative electrode, forming a mixed oxide metal oxide, including a metal oxide and/or a metal peroxide which is then situated at the positive electrode. During the charging reaction, the metal mixed oxide metal oxide decomposes, releasing oxygen which, in at least one embodiment, is stored in a metal oxygen framework (MOF) composition at the positive electrode. The metal cation migrates back to the negative electrode reacquiring an electron from the negative electrode and forming a metal composition.

Oxygen storage materials (OSMs) may be utilized for oxygen by providing appreciable surface area for enhancing oxygen uptake. Desirable on-board operating conditions illustratively include near ambient temperature (T) (e.g., 150 K to 400 K) and modest pressure (P) (e.g., 1 to 100 bar) to avoid added cost or system complexity. Particularly suitable binding energies for oxygen material storage may be determined based on the Clausius-Claeypron Equation of the form:

$$\ln P = \frac{-\Delta H}{R} \frac{1}{T}$$

where P is the partial pressure of oxygen, $\Delta H$ is the sorbent oxygen binding energy, R is a constant, and T is the temperature in degrees Kelvin of the oxygen. In certain other instances, the OSM has an oxygen binding energy, or particularly an isosteric adsorption enthalpy, ranging from 5 kJ/mol·$O_2$ to 100 kJ/mol·$O_2$, or 7 kJ/mol·$O_2$ to 70 kJ/mol·$O_2$, or to 10 kJ/mol·$O_2$ to 40 kJ/mol·$O_2$.

In one or more embodiments, OSMs may be utilized as oxygen storage materials for oxygen in terms of having relatively high material density. The volumetric storage capacity of an OSM may be related to the gravimetric capacity and material density for the OSM. As a non-limiting example, if a given OSM has a gravimetric capacity of 0.3 kg of oxygen per kg and a materials density of 0.2 g/mL, a corresponding volumetric capacity would be 60 g of oxygen per liter of OSM. Storing 8 kg of oxygen would use 133 liters of OSM. However, if the material density is 1 g/mL, only 27 liters of OSM would be required.

Without being limited to any particular theory, it is appreciated that the OSMs are generally provided with a relatively high-surface area, which facilitates oxygen uptake or adsorption by processes such as physiosorption. Such oxygen uptake scales linearly with surface area as measured using any suitable method such as the BET method. In certain instances, the surface area of the OSM exceeds 1000 $m^2/g$, from 2000 $m^2/g$ to 8000 $m^2/g$, or from 3000 $m^2/g$ to 6000 $m^2/g$.

In one or more embodiments, it is appreciated that oxygen molecules as described herein may include oxygen species other than oxygen, such as diatomic oxygen, ozone, and free radical oxygen species.

In certain instances, the OSM in the excess capacity has a gravimetric capacity for oxygen of greater than 10 grams per 100 grams of the OSM, or of between 20 to 80 grams per 100 grams of the OSM, or 25 to 50 grams oxygen per 100 grams of the OSM.

In certain other instances, the OSM has a material (single crystal) density greater than 0.1 g/mL, or of from 0.25 g/mL to 5 g/mL, or of from 0.5 g/mL to 2 g/mL.

In certain other instances, the OSM has a volumetric capacity for oxygen of greater than 2 g/L, or of from 16 g/L to 500 g/L, of or 32 g/L of to 300 g/L, or of from 50 g/L to 220 g/L.

In one or more embodiments to achieve the properties discussed above, the OSMs are porous, high surface area sorbent materials. Non-limiting examples of the OSMs include crystalline framework-like compounds such as metal-organic frameworks (MOFs), covalent organic frameworks (COFs), zeolitic imidazolate frameworks (ZIFs) and zeolitic materials; aerogel-like substances with nanometer or micrometer scale porosity, such as zero-gels and xero-gels; porous carbon materials such as porous carbon gels, porous carbon nanotubes; and porous metal substances such as porous metal oxides, porous metal carbides, porous metal nitride or other porous metal substances with internal sites that favorably form weak physical adsorption sites with oxygen.

Non-limiting examples of the MOFs include: a catalytically-active MOF-5 having embedded metal, such as Ag@[$Zn_4O(BDC)_3$], Pt@[$Zn_4O(BDC)_3$], Cu@[$Zn_4O(BDC)_3$], and Pd@[$Zn_4O(BDC)_3$]; an organically solvated MOF, such as Ti($O^iPr$)$_4$[$Cd_3Cl_6$(LI)$_3$]·4DMF·6MeOH·3$H_2O$, Ti($O^iPr$)$_4$[$Cd_3(NO_3)_6$(LI)$_4$]·7MeOH·5$H_2O$, Ti($O^iPr$)$_4$[Cd(M)$_2$($H_2O$)$_2$][$ClO_4$]$_2$·DMF·4MeOH·3$H_2O$, [$Rh_2(M^{2+}TCPP)_2$], where $M^{2+}$ may include Cu, Ni, or Pd, and [$Zn_2(BPDC)_2$(L2)]·10DMF·8$H_2O$; an ionically or partially ionically solvated MOF, such as [Ni(L-aspartate)bpy$_{0.5}$] HCl$_{0.9}$MeOH$_{0.5}$, [Cu(L-aspartate)bpy$_{0.5}$] HCl, [Cu(D-aspartate)bpy$_{0.5}$] HCl,

[Cu(L-aspartate)bpy$_{0.5}$] HCl, [Cu(D-aspartate)bpy$_{0.5}$] HCl, Cr$_3$(F,OH)(en)$_2$O(BDC)$_3$(ED-MIL-101), Cr$_3$(F,OH)(en)$_2$O(BDC)$_3$(ED-MIL-101), [Zn$_3$O(L3-H)].(H$_3$O)$_2$(H$_2$O)$_{12}$(D-POST-1), [Sm(L4-H$_2$)(L4-H$_3$)(H$_2$O)$_4$].(H$_2$O)$_x$, [Cu(bpy)(H$_2$O)$_2$(BF$_4$)(bpy)], [Zn$_4$O(BDC)$_3$](MOF-5), [Ln(OH)H$_2$O)(naphthalenedisulfonate)] where Ln includes a lanthanide metal such as Nd, Pr, or La; as well as [In$_4$(OH)$_6$(BDC)$_3$], [Cu$_3$(BTC)$_2$], [Sc$_2$(BDC)$_3$], [Sc$_2$(BDC)$_{2.5}$(OH)], [Y$_2$(BDC)$_3$(H$_2$O)$_2$].H$_2$O, [La$_2$(BDC)$_3$(H$_2$O)$_2$].H$_2$O, [Pd(2-pymo)$_2$], [Rh$_2$ (H2TCPP)$_2$)BF$_4$, [Cu$_2$(trans-1,4 cyclohexanedicarboxylate)$_2$]H$_2$O, [Cu(2-pymo)$_2$], [Co(PhIM)$_2$], [In$_2$(BDC)$_3$(bpy)$_2$], [In$_2$(BDC)$_2$(OH)$_2$(phen)$_2$], [In(BTC)(H$_2$O)(bpy)], [In(BTC)(H$_2$O)(phen)], [Sc$_2$(BDC)$_{2.5}$(OH)], [Y$_2$(BDC)$_3$(H$_2$O)$_2$].H$_2$O, [La$_2$(BDC)$_3$(H$_2$O)$_2$]H$_2$O, [Cu$_3$(BTC)$_2$], [Cd(4,4'-bpy)$_2$(H$_2$O)$_2$]-(NO$_3$)$_2$.(H$_2$O)$_4$, [Sm(L4-H$_2$)(L4-H$_3$)(H$_2$O)$_4$].(H$_2$O)$_x$, Mn$_3$[(Mn$_4$Cl)(BTT)$_8$(MeOH)$_{10}$]$_2$, [Zn$_4$O(BDC)$_3$](MOF-5), Ti-(2,7-dihydroxynaphthalene)-MOF, [Pd(2-pymo)$_2$], [Cu$_3$(BTC)$_2$], [Cu$_3$(BTC)$_2$], [Cu$_3$(BIC)$_2$], [Rh$_2$(L5)], [Rh(BDC)], [Rh(fumarate)], [Ru(1,4-diisocyanobenzene)$_2$]Cl$_2$, [In$_4$(OH)$_6$(BDC)$_3$], [Ru$_2$(BDC)$_2$], [Ru$_2$(BPDC)$_2$], [Ru$_2$(BDC)$_2$(dabco)], [Ru$_2$(BPDC)$_2$(dabco)], [Rh$_2$(fumarate)$_2$], [Rh$_2$(BDC)$_2$], [Rh$_2$(B$_2$TCPP)$_2$], and[Pd(2-pymo)$_2$].

In one or more embodiments, the MOF is a porous coordination network (PCN) having at least one entactic metal center (EMC), such as PCN-9 MOF. The EMC is an unusual geometry imposed by a ligand on a metal center in the MOF for the purpose of enhancing the MOF's affinity for oxygen. Non-limiting examples of imposed geometry include adapting organic positive electrode units to generate a pore comparable to the size of the oxygen molecule and introducing a coordinatively unsaturated metal center, such as a metal cation cluster. A combination of several EMCs may create a secondary building unit (SBU) within the MOF suitable for exceptional gas sorption affinity as determined by adsorption isotherms collected at various temperatures and fitted using the Langmuir-Fruendlich equation.

When applied as an example of the OSM, and in certain instances, PCN-9 may be provided with an oxygen adsorption enthalpy greater than 12 kJ/mol·O$_2$, ranging from 15 kJ/mol·O$_2$ to 45 kJ/mol·O$_2$, from 17 kJ/mol·O$_2$ to 43 kJ/mol·O$_2$, or 18 kJ/mol·O$_2$ to 23 kJ/mol·O$_2$. PCN-9 has a fixed pore diameter ranging from 0.55 nm to 0.75 nm or 0.6 nm to 0.7 nm.

In certain instances, the MOF includes a solvated MOF formed from 1,4-benzenedicarboxylic acid (BDC) with a zinc metal cation cluster. A non-limiting example of the solvated MOF is Zn$_4$ (μ-4O)(μ-BDC)$_3$.(DEF)$_7$, where DEF is diethylformamide, a solvent molecule.

An example of a manufacturing process for certain MOFs, such as the MOF-5, includes the steps of mixing a solution of terephthalic acid with a zinc salt, such as zinc nitrate to form a mixture. The mixture is crystallized or precipitated at a temperature ranging from 25° C. to 200° C. The precipitate is filtered from the solution and dried. It is appreciated that MOFs may be modified after synthesis via reactions such as oxidation, acetylization, hydrogenation, Knoevenagel condensation, and/or Heck coupling. Moreover, the MOFs may be activated by removing the solvent introduced during a crystallization and/or precipitation process.

In one or more embodiments, the second electrode 104b, which functions as an anode during discharging, includes a metal material (M). The metal material M may include a metal, such as an alkali metal, an alkaline-earth metal, or a transition metal. The metal material M may also include alloys of such metals, metal ceramics, superalloys, fusible alloys, metal intercalation compounds or materials, and amalgams. In certain particular instances, the metal material M includes an elemental monolith negative electrode, including, for example, Li or Na; a mixed material negative electrode, having an intercalation compound, such as graphite; and/or an alloy, such as a lithium-silicon alloy, a lithium aluminum alloy, and/or a lithium boron alloy.

In certain particular instances, the second electrode 104b is formed of elemental lithium metal. In certain other particular instances, the second electrode 104b includes an alloy of lithium.

While the best mode for carrying out the invention has been described in detail, those familiar with the art to which this invention relates will recognize various alternative designs and embodiments for practicing the invention as defined by the following claims.

What is claimed:

1. A battery system comprising:
   a metal oxygen battery (MOB) including an electrode and having oxygen uptake and release operating states;
   an oxygen containment unit (OCU) including an oxygen storage material (OSM), and having oxygen adsorption and oxygen desorption operating states, the oxygen adsorption and oxygen release operating states overlap; and
   a common, single conduit extending between and connected to the MOB and OCU and fluidly exchanging oxygen between them.

2. The battery system of claim 1, wherein the electrode is a first electrode, the metal oxygen battery further includes a second electrode including a metal material (M), the first electrode being a cathode and the second electrode being an anode.

3. The battery system of claim 1, wherein the battery system is closed-loop with respect to oxygen material flow.

4. The battery system of claim 1, wherein the material density of the OSM in the OCU is greater than 0.1 g/mL.

5. The battery system of claim 1, wherein the OCU is a sealed oxygen containment unit.

6. The battery system of claim 1, wherein the metal oxygen battery includes a metal material (M) and oxygen in the oxygen uptake state.

7. The battery system of claim 6, wherein the metal oxygen battery includes metal peroxide in the oxygen release state.

8. The battery system of claim 1, wherein the metal oxygen battery is substantially impermeable to atmospheric air.

9. The battery system of claim 1, wherein the OCU includes a vent for venting residual oxygen out and reloading fresh oxygen in.

10. A battery system comprising:
    a metal oxygen battery (MOB) including an electrode and having oxygen uptake and release operating states;
    an oxygen containment unit (OCU) including an oxygen storage material (OSM), and having oxygen adsorption and oxygen desorption operating states, the oxygen adsorption and oxygen release operating states overlap; and
    a common, single conduit extending between and connected to the MOB and OCU and fluidly exchanging oxygen between them, wherein the oxygen adsorption and release operating states collectively defining a reversible operating state.

11. The battery system of claim 10, wherein the battery system is closed-loop with respect to oxygen material flow.

12. The battery system of claim 10, wherein the metal oxygen battery is substantially impermeable to atmospheric air.

13. A battery system comprising:
- a metal oxygen battery (MOB) including a first electrode and a second electrode, the second electrode including a metal material (M), the MOB having oxygen uptake and oxygen release operating states;
- an oxygen containment unit (OCU) in communication with the MOB and including an oxygen storage material (OSM), the OSM having oxygen adsorption and oxygen desorption operating states, the oxygen adsorption and oxygen release operating states overlap; and
- a common, single conduit fluidly exchanging oxygen between the MOB and the OCU and vice versa.

14. The battery system of claim 13, wherein the material density of the OSM in the OCU is greater than 0.1 g/mL.

15. The battery system of claim 13, wherein the oxygen containment unit includes a vent for venting residual oxygen out and reloading fresh oxygen in.

16. The battery system of claim 13, wherein the battery system is closed-loop with respect to oxygen material flow.

17. The battery system of claim 13, wherein the OCU is a sealed oxygen containment unit.

18. The battery system of claim 13, wherein the metal oxygen battery includes a metal material (M) and oxygen in the oxygen uptake state.

19. The battery system of claim 18, wherein the metal oxygen battery includes metal peroxide in the oxygen release state.

20. The battery system of claim 13, wherein the metal oxygen battery is substantially impermeable to atmospheric air.

* * * * *